United States Patent [19]

Royer

[11] 4,439,499

[45] Mar. 27, 1984

[54] STRATIFIED CORROSION-RESISTANT COMPLEX

[75] Inventor: Michel E. Royer, La Balme de Sillingy, France

[73] Assignee: S. T. Dupont, Paris, France

[21] Appl. No.: 469,057

[22] Filed: Feb. 23, 1983

Related U.S. Application Data

[63] Continuation of Ser. No. 236,376, Feb. 20, 1980.

[30] Foreign Application Priority Data

Feb. 20, 1980 [FR] France ............................. 80 03699

[51] Int. Cl.³ .................... C22C 19/05; B32B 15/04
[52] U.S. Cl. ................................... 428/670; 428/672; 428/673; 428/680; 368/280
[58] Field of Search .............. 428/670, 672, 673, 680, 428/624; 368/280; 206/18; 29/179

[56] References Cited

U.S. PATENT DOCUMENTS

| | | | |
|---|---|---|---|
| 3,585,009 | 6/1971 | Harigaya | 368/280 |
| 3,627,561 | 12/1971 | Richards | 428/670 |
| 4,080,201 | 3/1978 | Hodge et al. | 75/171 |
| 4,155,782 | 5/1979 | Shimotori | 75/171 |

FOREIGN PATENT DOCUMENTS

| | | | |
|---|---|---|---|
| 54-102265 | 8/1979 | Japan . | |
| 55-18580 | 2/1980 | Japan . | |
| 55-82773 | 6/1980 | Japan . | |
| 55-145142 | 11/1980 | Japan . | |
| 2000188 | 1/1979 | United Kingdom | 75/171 |

OTHER PUBLICATIONS

"Alloy for Watch and Instrument Parts", Straumann, Chemical Abstracts, vol. 53, Oct. 31, 1958, Article 16910g.

"Material Engineering File Facts", Meierdirks, Materials and Methods, Sep. 1953, p. 139.

"Nickel-Tantalum Alloys", Kotrol, Chemical Abstracts, vol. 74, Dec. 1970, 56757x.

*Primary Examiner*—L. Dewayne Rutledge
*Assistant Examiner*—J. J. Zimmerman
*Attorney, Agent, or Firm*—Robert A. Shack

[57] ABSTRACT

The present invention relates to a stratified, corrosion-resistant complex comprising a metal substrate and an outer layer made of a noble material. According to the invention the substrate is composed of an alloy having, by weight at least 45% nickel, at least 7% chromium, and at least 7% molybdenum, all the other components of the substrate representing at most 15% of the alloy.

The invention is particularly useful for making the backs of watch cases.

6 Claims, No Drawings

STRATIFIED CORROSION-RESISTANT COMPLEX

This application is a continuation, of application Ser. No. 236,376, filed Feb. 20, 1981.

BACKGROUND OF THE INVENTION

1. Field of the Invention

This invention relates to a stratified complex comprising a metal substrate and an outer layer made of a different material, in particular a noble material such as a precious metal (gold, platinum, etc.) Chinese lacquer, or the like. The invention relates particularly to a stratified complex of this type in which the substrate is able to withstand corrosion under prolonged, arduous conditions.

2. Description of the Prior Art

Prolonged, arduous conditions of use are encountered, in particular, in wristwatch cases which are in direct contact with the skin for long periods of time and hence undergo the corrosive action of perspiration. Accordingly, it is customary to make the backs of watch cases, even of luxury watches, out of steel known as "stainless" steel. Under normal utilization conditions, this steel becomes stainless because an impermeable oxide film forms on the surface and protects it.

Of course it is possible to make watch case backs out of gold, since this metal is fully resistant to the usual types of attack and corrosion. However the cost of such cases makes gold prohibitive for most watches, even luxury watches; it can be used only for extremely costly watches. Attempts have been made to realize the advantages of gold by goldplating the backs of watch cases, but this has proved unsatisfactory.

When a thin layer of one metal is deposited on another metal or alloy, electrolytically or by some other means, however carefully the process is conducted, the deposited layer always has micropores or microfissures, and the same thing occurs when a metal is coated with a layer of varnish or the like. If the backing is not stainless, the micropores and microfissures permit local oxidation to occur which, in the long term, causes the outer layer to come loose from the substrate. If a stainless steel substrate is used, one then encounters the problem of the behavior of the protective impermeable film in the presence of perspiration components, in particular chlorides and organic acids.

The impermeable film, which is composed of oxides, can form only in an oxygen-containing medium and requires a great deal of aeration to reconstitute, if it has been attacked. If chloride traces, for example, become deposited in the micropores and microfissures, the surface of the stainless steel in contact with these chlorides is insufficiently aerated for the impermeable film to reconstitute itself, so that the steel corrodes locally, with the eventual result that the outer layer peels.

It has also been proposed that classical stainless steel be replaced by special steels. However the same phenomena of local attack in the micropore and microfissure zones of the outer layer are encountered.

SUMMARY OF THE INVENTION

The object of the present invention is to provide a stratified complex wherein the metal substrate is capable of resisting any attack by human perspiration, even in the micropore and microfissure zones of the outer layer.

According to the invention, this metal substrate is composed of a nickel alloy with (by weight) a minimum of 45% nickel, 7% chromium, and 7% molybdenum, with any additives present representing not more than 15% of the total composition of the alloy. Preferably the quantity of chromium will be approximately equal to the quantity of molybdenum and will represent about one quarter of the quantity of nickel. More preferably the substrate will have (by weight) approximately 54% nickel, 16% chromium, and 16% molybdenum.

Systematic tests I have previously performed, with complexes comprising substrates made of materials with a good reputation for corrosion resistance under normal conditions, have show that these substances corroded very rapidly on contact with perspiration. This makes it all the more surprising that the complex according to the invention fully resists prolonged exposure to the action of human perspiration.

The tests referred to are conducted with specimens exposed to an air atmosphere at 40° C., saturated with vapors from a mixture of chemical compounds able to reproduce the effects of human perspiration, and the time after which either the substrate corroded or the outer layer peeled was noted.

The composition of the mixture is that recommended by the German institute, Bundes Anstalt für Materialprüfung, specifically the following, in grams per liter of aqueous solution: sodium chloride: 20.0 g, ammonium chloride: 17 5 g, urea: 5.0 g, acetic acid: 2.5 g, pyruvic acid: 2.5 g, butyric acid: 5.0 g, lactic acid: 15.0 g, sodium hydroxide: quantity to bring the pH to 4.7. The mixture is sprayed in a fine mist from an atomizer over the entire surface of the samples to be tested, which are then suspended above the same mixture in a sealed vessel placed in a 40° C. oven. The samples under test are in the shape of planchets 2 cm in diameter and 2 to 3 mm thick. They are coated either with a layer of gold 20 microns thick or a layer of Chinese lacquer.

As indicated hereinabove, the tests were carried out with samples of materials known for their corrosion resistance under extremely varied conditions such as those found in the chemical industry, canning, or the field of human or animal prostheses. The results of these tests are shown in Table I below, wherein Column 1 gives the name and composition of the alloy tested, Column 2 shows the number of days after which traces of corrosion were found on the gold-plated samples, and Column 3 shows the number of days after which lacquer began to peel on the lacquered samples.

TABLE I

| 1 | 2 | 3 |
|---|---|---|
| Brass (Cu: 60%, Zn: 40%) | 1 | 4 |
| "A" nickel* (Ni: 99.5%, other: 0.5%) | 2 | 10 |
| Inconel 600* (Ni: 76%, Cr: 16%, Fe: 7.0% Other: 1%) | 2 | 13 |
| 18-10 stainless steel (Inox 18-10) (Fe: 78.5%, Cr: 18%, Ni: 10% Other: 3.5%) | 2 | 15 |
| 18-10-3 stainless steel (Inox 18-10-3) (Fe: 75.5%, Cr: 18%, Ni: 10%, Mo: 3%, Other: 3.5%) | 3 | 12 |
| "K" Monel* (Ni: 66%, Cu: 29%, Al: 3% Other: 2%) | 4 | 15 |
| Hastelloy B* (Ni: 62%, Mo: 28%, | 0.5 | 40 |

TABLE I-continued

| 1 | 2 | 3 |
|---|---|---|
| Other: 10%) | | |

*Registered trademark

For the purposes of comparison, using the same atmospheric conditions, bare (uncoated) pieces of these same alloys were tested, and Table II gives the ranking of these alloys in decreasing order of degree of corrosion.

TABLE II

| | After 5 hours | After 8 hours | After 24 hours |
|---|---|---|---|
| 1 | Brass | 1 Brass | 1 Brass |
| 2 | Monel | 2 Inox 18-10 | 2 Inox 18-10 |
| 3 | Inox 18-10 | 3 Monel | 3 Monel |
| 4 | Nickel | 4 Nickel | 4 Hastelloy B |
| 5 | Hastelloy B | 5 Inconel | 5 Nickel |
| 6 | { Inconel | 6 Hastelloy P | 6 Inox 18-10-3 |
|   | Inox 18-10-3 | 7 Inox 18-10-3 | 7 Inconel |

The above tables show the anomalous nature of the tests performed and the random character of the results obtained. First of all there are substantial differences in the behavior of these alloys depending on whether they are used alone or as substrates. When nickel alloys are used as substrates, it is seen that Inconel 600 with 76% nickel and 16% chromium proves less satisfactory than "K" Monel, with 66% nickel and 29% copper, and than Hastelloy B, with 62% nickel and 28% molybdenum; such a result appears surprising in view of the corrosion-protective role of chromium. The same observation in made about the stainless steels, i.e., the addition of 3% molybdenum, which is very significant with regard to corrosion resistance by organic acids, does not substantially change the test results.

Referring now to the utilization of the tested alloys, here, too, it is impossible to establish a correlation among the results obtained that could be logically lead toward a satisfactory substrate. It is found, for example, that alloys such as "Inconel," "A" nickel, and "K" Monel, which are recommended for their resistance to organic acids and chlorides, do not resist corrosion when used as substrates under the conditions defined hereinabove. It is also found that the stainless steels used in the field of human and animal prostheses do not resist, as substrates, an environment reproducing the physical and chemical characteristics of human perspiration. Thus it is particularly surprising that the metal substrate of the complex according to the invention remains insensitive to the effects of human perspiration when this complex remains in contact with human skin for long periods of time, while the corrosion resistance of this substrate, under normal utilization conditions, is comparable to that of the alloys mentioned in the table above, in all regards.

As examples of two types of substrates according to the present invention, successfully tested under the test conditions reported hereinabove, are nickel alloys marketed under the trademark Hastelloy C. The composition of one substrate was the following by weight: Ni: 54%, Mo: 15.5%, Cr: 15.5%, Other: 15%. The composition of the second substrate was: Ni: 62%, Mo: 16%, Cr: 16%, Other: 6%. No trace of oxidation appeared after 140 days of uninterrupted testing on planehets of these substrates coated with a 20-micron-thick layer of gold. Some continuing tests, starting with the same substrate, but covered this time with Chinese lacquer, have shown no loosening of the lacquer layer after 500 days.

Additional tests performed establish that the nickel content of an alloy able to form the substrate of a complex according to the invention must represent at least 45% by weight of this alloy, while the chromium and molybdenum contents must both be equal to at least 7% by weight. In addition the total of the other alloy components, such as tungsten, iron, cobalt, manganese, and silicon, must not exceed about 15% by weight of the total weight of the substrate.

We claim:

1. A corrosion-resistant metal laminate, comprising:
   a metal alloy substrate comprising, by weight at least 45% nickel, at least 7% chromium, at least 7% molybdenum, and balance composition of up to 15%; and
   an exterior layer formed on said substrate, said exterior layer being chosen from the group consisting of the nobel metals and Chinese lacquer.

2. The laminate of claim 1, wherein the percentage weight of said chromium and molybdenum are approximately equal to each other and to about 25% of the percentage weight of said nickel.

3. The laminate of claim 1, wherein said alloy comprises, by weight, approximately 54% nickel, 15.5% chromium, 15.5% molybdenum and balance composition of approximately 15%.

4. The laminate of claim 1, wherein said alloy comprises, by weight, approximately 62% nickel, 16% chromium, 16% molybdenum and balance composition of approximately 6%.

5. An article of manufacture adapted for use in prolonged contact with human skin made from the laminate of claim 6.

6. The article of manufacture of claim 5, wherein said article is the back of a wristwatch case.

* * * * *